United States Patent
Wiart

[15] 3,639,818
[45] Feb. 1, 1972

[54] ELECTRONIC SWITCHING FOR THE WINDINGS OF ELECTRICAL MACHINERY

[72] Inventor: Albert Wiart, Sannois, Val d'Oise, France
[73] Assignee: Societe Anonyme dite: Jeumont-Schneider, Paris, France
[22] Filed: Oct. 24, 1969
[21] Appl. No.: 869,289

[30] Foreign Application Priority Data

Oct. 25, 1968 France..................................171311
June 10, 1969 France..................................6919048
Oct. 9, 1969 France..................................6934509

[52] U.S. Cl..................................318/138, 321/18, 318/227
[51] Int. Cl..................................H02k 29/00
[58] Field of Search..................321/18; 318/254, 217, 230, 318/432, 430

[56] References Cited

UNITED STATES PATENTS

| | | | |
|---|---|---|---|
| 3,354,370 | 11/1967 | Corry et al. | 318/227 |
| 3,384,804 | 5/1968 | Salihi | 318/227 X |
| 3,395,328 | 7/1968 | Huntzinger | 318/138 X |
| 3,414,800 | 12/1968 | Sheldrake | 318/138 X |
| 3,474,320 | 10/1969 | Chandler | 318/227 X |
| 3,483,458 | 12/1969 | Kirk | 318/254 X |
| 3,495,149 | 2/1970 | Swain | 318/138 |
| 3,509,440 | 4/1970 | Johnston | 318/227 |

Primary Examiner—G. R. Simmons
Attorney—Raymond A. Robic

[57] ABSTRACT

A system for switching and chopping DC current flowing through the windings of an electric machine, characterized in that the system comprises: a smoothing reactor common to the various windings; supply thyristors interposed between the winding ends and one of the poles of the power supply; freewheeling thyristors connected, like the first-mentioned thyristors, to the winding ends and to a common connection of a freewheeling circuit made by way inter alia of the smoothing reactor, at least one winding and the corresponding freewheeling thyristor; and a system for controlling the switch and driving the thyristor control electrodes so as to initiate the chopping or switching operations, with the intervention of the freewheeling circuit, in dependence upon the value of the control parameters.

13 Claims, 13 Drawing Figures

PATENTED FEB 1 1972

INVENTOR
Albert WIART
BY
ATTORNEY

INVENTOR
Albert WIART

INVENTOR
Albert WIART
BY
ATTORNEY

INVENTOR
Albert WIART

INVENTOR
Albert WIART

ELECTRONIC SWITCHING FOR THE WINDINGS OF ELECTRICAL MACHINERY

The speed characteristic of brushless AC motors is of course either asynchronous or synchronous according as the rotor is plain or whether the pole tips are salient and magnetized or not, in which latter event the motor is of the variable reluctance kind. Also, of course, the speed of such motors can be varied by their windings being energized not continuously on AC but consecutively in a predetermined sequence by an adjustable DC, each such winding comprising one or more coils according to circumstances.

This invention, relates to a switching system of use more particularly for energizing the windings of such a machine consecutively and with an adjustable current for speed control purposes.

The invention relates mainly to a switching system adapted to chop the DC or rectified voltage energizing an asynchronous or synchronous motor so as to control the mean current value and to switch such current from one winding to another for speed control purposes.

The invention also relates to a switching system which can operate in both the cases just outlined without interrupting the current flow through the motor, the consecutive energization periods of the machine being, whether the system operates as a chopper or as a switch, separated by an intermediate period in which the current is maintained substantially constant through the agency of a freewheeling circuit.

The invention has as its third subject a switching system adapted to operate over a wide speed range.

Accordingly, the various windings of the machine are associated with a smoothing reactor, with energizing thyristors and with freewheeling thyristors, the two kinds of thyristors being interconnected and controlled, through the agency of an appropriate drive, either to chop the current or to switch The same by diverting it in both cases, at the time when the machine is deenergized, into a freewheeling circuit which helps to reduce pulsations of the current and consequently a pulsating driving torque.

The switching procedure briefly outlined in the previous paragraph can according to the invention be under the control of a capacitor so connected in a control circuit as to be regularly charged to an appropriate voltage and, if the polarities of the various elements are arranged appropriately in relation to one another, to close (render nonconductive) the supply thyristor in operation when the corresponding freewheeling thyristor is fired; when the capacitor is discharged, the freewheeling becomes fully operative and, of course, disappears after the firing of any of the supply thyristors.

When the switching system according to the invention is used in a salient-pole or bladed machine, discharge of the capacitor is triggered for switching by known means based on a device for detecting the position of the moving part of the motor and, for speed control purposes, by known means based on control signals processed to vary the relationship between, on the one hand, the times for which the supply thyristors are open and, on the other hand, the times for which the freewheeling thyristors are open. The control signals are output in accordance with familiar control methods based e.g., on time control or current control.

When the switching system according to the invention is used in an asynchronous or free rotor kind of machine, discharge of the capacitor is triggered by signals which in the case of switching are output as a frequency approximately proportional to the required motor speed and which in the case of chopping are produced by familiar control methods, e.g., time control or current control.

Accordingly, the switching system according to the invention mainly comprises: a smoothing reactor common to the various windings to be switched; supply thyristors and freewheeling thyristors connected to the windings the same way round as the latter, the switching thyristors also being connected to the power supply; means for so controlling the various thyristors as to consecutively select the windings to be cut into and out of operation or on to freewheeling and to control the mean current in the time interval between two switching operations by the relationship between the times for which, on the one hand, the switching thyristors and, on the other hand, the freewheeling thyristors are open; and means enabling the motor to be braked.

The features and operation of the switching system according to the invention will become more clearly apparent from the following description of some embodiments, reference being made to the accompanying diagrammatic drawings wherein.

Figure 1:
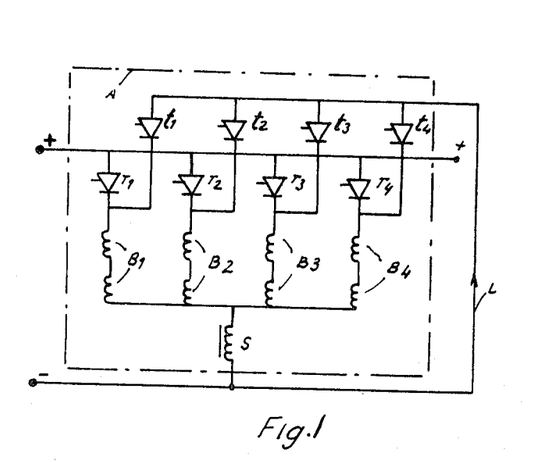
FIG. 1 shows a circuit diagram for a machine having four switch-controlled windings.

Referring to the chain-dotted framing A in FIG. 1, there can be seen therein, interconnected as shown, thyristors $T_1$, $T_2$, $T_3$ and $T_4$ for energizing windings $B_1$, $B_2$, $B_3$, $B_4$ of a four-phase machine, and thyristors $t_1$, $t_2$, $t_3$, $t_4$ of freewheeling circuits having a common line L, and a smoothing reactor.

Figure 2:
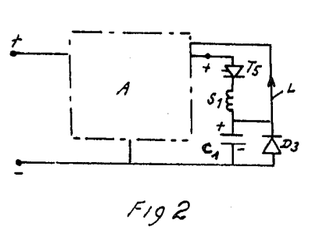
FIGS. 2 and 3 show the same switching system as in FIG. 1 but with capacitor control.

In the arrangement shown in FIG. 2, the current supplied by the power supply is interrupted a capacitor $C_1$ in parallel with a diode $D_3$ is connected in the freewheeling line L and is connected to the positive side of the power supply via an inductance $S_1$ and a thyristor $T_5$. Through the agency of the resulting charging circuit, of course, capacitor $C_1$ can be charged to substantially twice the power supply voltage when a signal is applied to the control electrode of thyristor $T_5$. For line current chopping with or without switching with the circuit arrangement in FIG. 2, the thyristor $t_1$ corresponding to the winding $B_1$ in use is fired and the voltage across capacitor $C_1$ raises the cathode of thyristor $T_1$ to a potential above the potential of the power supply, so that thyristor $T_1$ closes; the current flowing through winding $B_1$ is boosted by the reactor S and flows first through capacitor $C_1$ and line L and subsequently, once capacitor $C_1$ has discharged, through diode $D_3$ and line L—i.e., the current now flows through the freewheeling circuit. To reclose the main circuit, either $T_2$ or $T_1$ is fired, according as chopping with or without switching of windings is required, whereafter thyristor $T_5$ is fired to recharge capacitor $C_1$.

Figure 3:
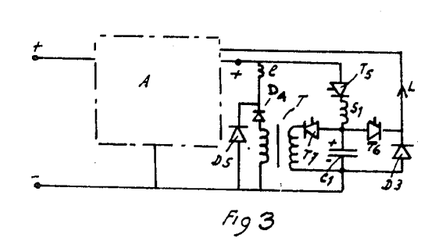

For some uses the capacitor-charging circuit must be dissociated from the freewheeling circuit to obviate interaction between the two circuits, and when the energy stored in the capacitor is excessive because of the switching current entailed, such energy must be recovered at the supply. For these two purposes, and as shown in FIG. 3, the circuit arrangement shown in FIG. 2 has added to it thyristors $T_6$, $T_7$, a transformer T and diodes $D_4$, $D_5$. With these various integers interconnected as shown, the freewheeling circuit and the capacitor-charging circuit are independent of one another while thyristor $T_6$ is in the closed state; also, when thyristor $T_7$ is open, the surplus energy of capacitor $C_1$ can be returned to the power supply via the transformer T associated with the diodes $D_4$, $D_5$.

Rheostatic braking can be provided with the arrangement shown in FIG. 3 if a rheostat in series with a diode is connected between the common point of thyristors $t_1$ to $t_4$ and the negative side of the power supply and if a thyristor replaces diode $D_3$. The main current can then flow at choice either through the freewheeling loop or through the brake rheostat.

Figure 4:
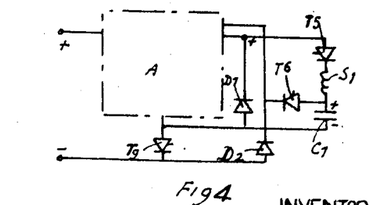
FIG. 4 shows a circuit arrangement similar to the circuit arrangement of FIG. 1 plus regenerative braking means.

The circuit arrangement shown in FIG. 4 operates like the circuit arrangement of FIG. 2 and also has provision for regenerative braking. Diodes $D_1$, $D_2$ complete a regeneration circuit via which current can flow from the negative pole of the supply, diode $D_2$, any of the freewheeling thyristors $t_1$–$t_4$, any of the motor windings $B_1$–$B_4$, the smoothing reactor S, the diode $D_1$ and back to the positive side of the power supply. Assuming that the motor is operating as a motor and current flows from the source through $T_1$, $B_1$, S, $T_9$, then if $T_1$ and $T_9$ are extinguished by capacitor C discharging due to $t_1$ firing, operation becomes regenerative. If $T_9$ reopens, the freewheeling circuit is produced as S, $T_9$, $D_2$, $t_1$ and $B_1$.

The operation of some kinds of electric motor is such that two windings require to be energized simultaneously and each such winding has to be switched consecutively and alternately with other windings of the machine. These considerations apply e.g., to the variable-reluctance motors disclosed by French Pat. No. 1,445,572 and Addition No. 89,954 thereto filed by Messrs. J. and J. Jarret on May 19, 1965 and June 15, 1966, respectively and to the case of polyphase machines whose slots carry twice the normal number of windings. In such cases the invention uses a step-by-step switching system operated similarly to the switching system hereinbefore described except that the supply thyristors, together with the windings serially associated therewith, are connected parallel circuits in the manner shown in FIG. 5.

Figure 5:
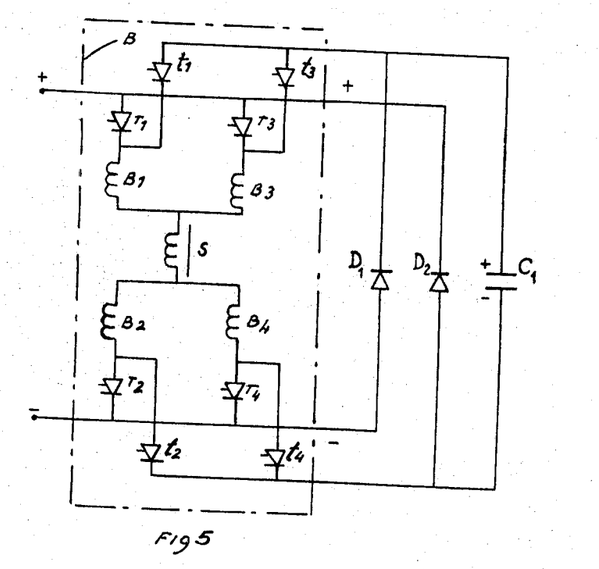
FIG. 5 shows a circuit arrangement for a machine which operates with two windings in use simultaneously, with capacitor control.

FIG. 5 shows a circuit arrangement where a freewheel circuit is combined with a regenerative braking circuit. To change from motor operation (alternately open switching thyristors) to regeneration with this circuit arrangement, when e.g., $T_1$ and $T_2$ are open, $t_1$ and $t_2$, which have opened for the purpose, are used to discharge a capacitor $C_1$ which has previously been charged up to about twice the supply voltage, e.g., along the lines described with reference to FIG. 2. The supply thyristors $T_1$ and $T_2$ therefore close, and after the capacitor has discharged a regeneration circuit is produced extending from the negative side of the supply via D, $t_1$, $B_1$, S, $B_2$, $t_2$ and $D_2$ to the positive side of the supply. To change over to freewheeling operation by $D_1$ (or $D_2$), the thyristor $T_2$ (or $T_1$) reopens. Another feature of the arrangement shown in FIG. 5 is that it can use the changeover from regeneration to freewheeling in order to switch, for when the regeneration circuit has been set up as just described, all that is needed to switch the current flowing through winding $B_2$ to winding $B_4$ is to fire thyristor $T_4$; since the same is at the power supply negative potential and thyristor $t_2$ is at power supply positive potential (applied via the open diode $D_2$), the current flowing through the windings $B_2$, $B_4$ reverses—i.e., the current in these two windings is switched. This is a useful feature when it is required not to draw power from the supply even during switching, for instance, for low-speed running and running with braking.

If the arrangement shown in FIG. 5 has added to it a diode and a rheostat connect in series across the capacitor $C_1$, braking is rheostatic when the supply thyristors are closed, with or without the aid of regenerative braking according as the voltage output by the machine is higher or lower than the supply voltage.

Figure 6:
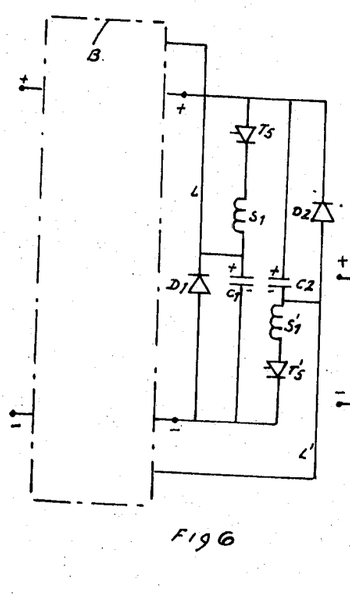
FIGS. 6 and 7 show circuit arrangements similar to the circuit arrangement of FIG. 5 but with a dual freewheeling and braking circuit.

The circuit arrangement shown in FIG. 6 differs from the arrangement shown in FIG. 5 in that two freewheeling circuits, one of which extends by way of a diode $D_1$ and the other by way of a diode $D_2$, are associated with capacitors $C_1$, $C_2$ chargeable to almost twice the supply voltage by means of oscillatory circuits comprising inductances $S_1$, $S'_1$ in series with respective thyristors $T_5$, $T'_5$, in which event the even thyristors can be extinguished without the odd thyristors extinguishing and vice versa.

The switching control system shown in FIG. 6 operates as follows:

Assuming that the thyristors $T_1$, $T_2$ are open, the opening of thyristor $t_1$ causes the voltage of capacitor $C_1$ to be applied via line L TO $T_1$, which extinguishes; once $C_1$ has discharged, a freewheeling circuit is set up by way of $D_1$ and L. If in this state of affairs $T_1$ and $t_2$ open, the second freewheel circuit is set up (by way of L' and $D_2$), $t_1$ extinguishes and the first freewheeling circuit is removed. A change has therefore been made from one freewheeling circuit to the other. If, assuming freewheeling operation using L, only $t_2$ opens, the power supply has connected across it a circuit comprising $D_1$, $t_1$, $B_1$, S, $B_2$, $t_2$ and, when capacitor $C_2$ has discharged, $D_2$; meanwhile, $T_2$ has extinguished. A regeneration circuit has therefore been formed by combination of the two freewheeling circuits.

With the system in this regeneration position, current can be switched from one winding to another, e.g., from $B_2$ to $B_4$. In this case, opening $T_4$ causes $t_2$ to extinguish immediately after switching of the current due to the voltage difference across $t_2$ and $T_4$. Consequently, with the circuit arrangement shown in FIG. 6, the even (or odd) windings can be switched if the freewheeling circuit using L' and $D_2$ (or L and $D_1$) is in use or if operation is regenerative. This possibility makes possible the two following typical operations:

Pulsating motor operation (pulsating between freewheeling and energization by power supply). Switching is by changing over to freewheeling (unless this effect obtains already) and then firing the required thyristor on the power supply side;

Pulsating braking operation (pulsating between freewheeling and regeneration). Switching is by changing over to regeneration (unless regeneration obtains already), whereafter to change back to freewheeling the required thyristor on the power supply side is fired.

Figure 7:
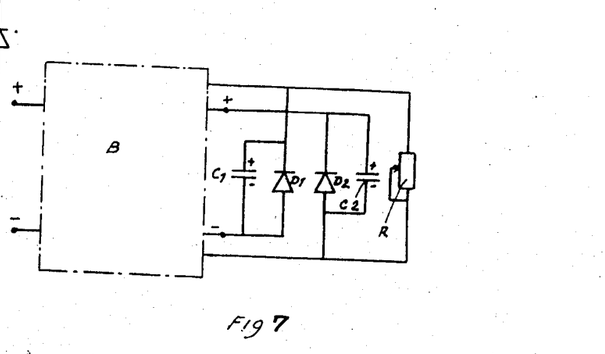

The circuit arrangement shown in FIG. 7 is similar to FIG. 6 with the addition of a rheostat R connected up as shown. In this embodiment, rheostatic braking and regenerative braking are produced simultaneously when the voltage output by the machine is higher than the power supply voltage, only rheostatic braking being operative in other cases. In other words, regenerative braking cuts in, if possible, only when the voltage across the rheostat exceeds the supply voltage.

One of the common features of all the variants so far described is that the windings are energized individually by means of a supply thyristor and are deenergized for chopping or switching by cutoff of such thyristor as a result of the application to its electrodes via a freewheeling thyristor of a reverse voltage higher than the supply voltage and output by a previously charged capacitor, this deenergization being followed by a freewheeling period in which a common smoothing reactor ensures a slow decrease in the current flowing through the windings.

The embodiments to be described hereinafter have the same general characteristic but differ from the foregoing embodiments:

either because the capacitor is charged up through a supply thyristor and not through a special thyristor, or because other ways and means are used to discharge each surplus energy of the capacitor charge as is not used in the motor in switching or chopping operations, or because of the electrical position of the capacitors and their associated charging and discharging facilities, or because the freewheeling circuits of the earlier embodiments are divided up into freewheeling circuits of the same number as there were motor windings connected to the freewheeling circuits of the previous embodiments.

Figure 8:
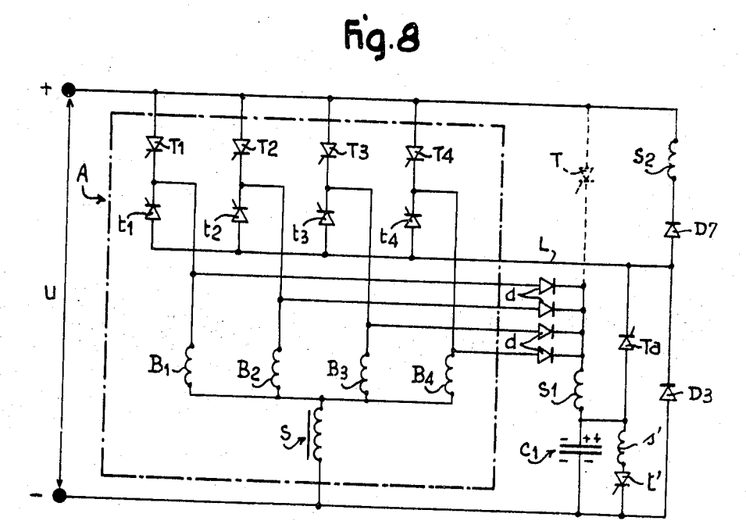
FIGS. 8–10 are circuit diagrams operating very similarly, the circuit of FIG. 8 being for switching windings distributed in a single group whereas the circuits shown in FIGS. 9 and 10 are for switching windings divided into two groups.

The circuit arrangement shown in FIG. 8 is comparable as regards possible uses with the embodiment shown in FIG. 3. In the arrangement shown in FIG. 8, a capacitor $C_1$ and an inductance $S_1$ are energized via one of diodes $d$ at a voltage U immediately any of thyristors $T_1$ to $T_4$ fires; since the inductance $S_1$ and capacitor $C_1$ together form an oscillatory circuit, the capacitor of course is finally charged up to substantially twice the voltage U; simultaneously, one of the windings, e.g., the winding $B_1$ if the thyristor which has opened is the thyristor $T_1$, is energized.

To briefly deenergize $B_1$ either for chopping or to alternate the mean value of the current flowing therethrough or to switch the current to some other winding, e.g., $B_2$, thyristor $t_1$ and an auxiliary thyristor $T_a$ open simultaneously, with the result that in a first phase thyristor $T_1$ is closed by an application of the reverse overvoltage from the capacitor $C_1$, so that winding $B_1$ is isolated from the power supply, whereafter in a second phase capacitor $C_1$ discharges to the power supply U via thyristor $T_a$, diode $D_7$ and inductance $S_2$; the resulting circuit is also adapted to oscillate and can thus discharge the capacitor very nearly to zero, the latter discharge being extra to the discharge occurring anyway via the motor circuit.

Upon completion of the discharge, the current flowing through winding $B_1$ and maintained by reactor S is diverted via the freewheeling circuit embodied by the diode $D_3$, the line L and the thyristor $t_1$.

Clearly, when the current drawn by $B_1$ is relatively low, the freewheeling circuit should cut in very rapidly to facilitate adjustment of such current to its mean value; the integers $C_1$, $S_2$ forming the oscillator circuit are determined to meet this requirement but also so as to maintain the capacitor charge long enough to ensure that $T_1$ definitely extinguishes when $t_1$ fires. According to the invention, to deal with the possibility of a residual voltage across $C_1$, the arrangement can further comprise a charge-reversing inductance $s'$ associated with a thyristor $t'$ which fires substantially at the end of the discharge time.

Figure 9:
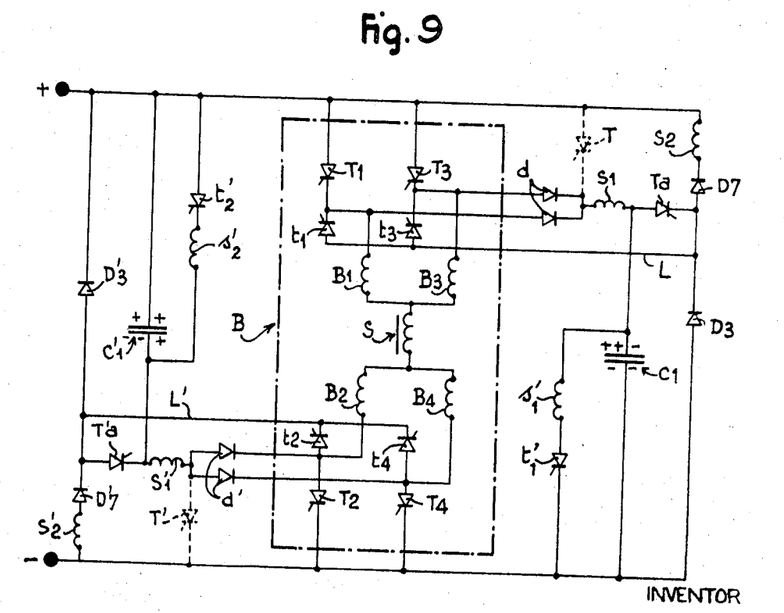

According to the invention, a circuit arrangement of the kind shown in FIG. 9, which has, but in a simplified form, the same features as the arrangement shown in FIG. 6, is used for motors which operate on the basis of simultaneous energization of two windings and consecutive and alternate switching between one or other of such windings and a third winding. The arrangement shown in FIG. 9 relates to a double freewheeling circuit providing regenerative operation as well as chopped-current operation with or without switching of an even or odd winding. In the operation of such an arrangement, it will be assumed that the windings $B_1$, $B_2$ are connected by the voltage supply U via reactor S and thyristors $T_1$, $T_2$, and so capacitor $C_1$ is charged to a voltage of substantially 2U via $S_1$ and one of diodes $d$; as a result of $t_1$ and $T_a$ opening, $T_1$ closes, and after $C_1$ has discharged to the supply via the motor windings and via $T_a$, $S_2$ and $D_7$ the windings $B_1$, $B_2$ and the reactor S are coupled with the freewheeling line L via $t_1$, $D_3$ and $T_2$; the motor then operates by freewheeling effect, the current which flows through the windings in use going through the resulting freewheeling circuit and being maintained substantially constant through the agency of the reactor S. If when $T_1$ and $T_2$ are conductive a second control circuit is used which is symmetrical of the previous one and whose integers are denoted in FIG. 9 by the same letters plus the apostrophe sign, a second freewheeling circuit formed by the integers $t_2$, $L'$, $D'_3$ and $T_1$ comes into operation after the opening of $t_2$ and $T''_a$ instead of $t_1$ and $T_a$.

This second freewheeling circuit can also come into operation if, with the first freewheeling circuit made, $T_1$ fires simultaneously with $t_2$ and $T'_a$, the effect of $T_1$ firing being to extinguish $t_1$.

If $t_1$, $t_2$ conduct simultaneously, then $T_1$, $T_2$ cut off and a regenerative braking circuit comes into being by way of $D_3$, L, $t_1$, $B_1$, S, $B_2$, $t_2$, $L'$ and $D'_3$. With the system of this state, current can be switched from one winding to another, e.g., from $B_2$ to $B_4$. This can be done by $T_4$ firing, to extinguish $t_2$, immediately after switching due to the voltage difference across $t_2$ and $T_4$. With the arrangement shown in FIG. 9, therefore, even (or odd) windings can be switched when the motor is on freewheeling operation (via $L'$ or L) or when it is regenerating. This possibility leads to the two following typical operations:

Pulsating motor operation (pulsating between energization and freewheeling). For switching, a change is made to freewheeling operation (unless the flywheel state exists already) and then firing the appropriate supply transistor, pulsating regenerative operation (pulsating between freewheeling and regeneration); a changeover is made to regeneration (unless the system is already in the regenerative state) for switching, whereafter the appropriate supply thyristor is fired to return to the freewheeling state.

In other words, the arrangement shown in FIG. 9 can provide the following operating features:

Operation as a motor or on regenerative braking.

In either case:

The mean current flowing through the windings is controlled by being chopped by one of the freewheeling circuits, and current can be switched between two even to two odd windings after the appropriate freewheeling circuit has cut in.

Figure 10:
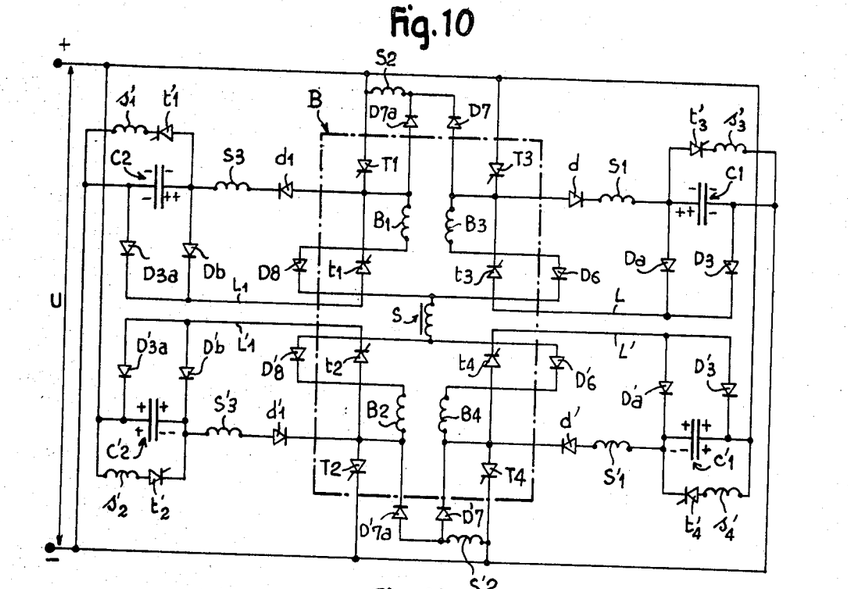

FIG. 10 shows another form of control and switching system operating in conditions comparable to the conditions for FIG. 9, with freewheeling and independent control circuits for each of the windings $B_1$ to $B_4$. The following operating phases can be considered with the arrangement shown in FIG. 10.

1. By firing of thyristors $T_1$ and $T_2$: (a) energization of windings $B_1$, $B_2$ through smoothing reactor S and diodes $D_8$, $D'_8$, and (b) charging of capacitors $C_2$, $C'_2$ to substantially twice the voltage U through inductances $S_3$, $S'_3$ and diodes $d_1$, $d'_1$.

2. By firing of thyristors $t_1$: (a) cutoff of $T_1$ by application of reverse voltage; (b) discharge of capacitor $C_2$ through windings $B_1$, $B_2$ and also through diode $D_b$, line $L_1$, thyristor $t_1$, diode $D_{7a}$ and the inductance $S_2$, to all the control sections of the odd-numbered windings and, if required, completion of discharge via $s'_1$ after ignition of $t'_1$, and (c) cutting in of the freewheeling circuit formed by integers $D_{3a}$, $L_1$, $t_1$, $B_1$, $D_8$, S, $D'_8$, $B_2$ and $T_2$.

3. By the firing of $t_2$ instead of $t_1$, cutting in by a similar chain of circumstances of the freewheeling circuit comprising the same windings and the integers $D'_{3a}$, $L'_1$, $t_2$ and $T_1$.

4. By firing of $t_1$, $t_2$ starting from any of the previous stages: setting up of a circuit regenerating to the power supply via $D_{3a}$, $L_1$, $t_1$, $B_1$, $D_8$, S, $D'_8$, $B_2$, $t_2$, $L'_1$ and $D'_{3a}$.

5. Starting from the previous state: return to freewheeling operation after firing of $T_1$ or $T_2$.

6. In the regenerative position: switching of current e.g., from $B_1$ to $B_3$ after firing of $T_3$.

7. While operating as motor: switching of current, e.g., from $B_1$ to $B_3$, by ignition of $T_3$ after the system has changed over to the freewheeling state defined in 2.

Due to the symmetry of the circuit diagram in FIG. 10, the explanations just given can readily be transferred to cover control of the other windings.

In FIG. 10, just as in FIGS. 9 and 10, the inductances and thyristors denoted by the letters $s'$ and $t'$ with or without index serve to finish off the discharge of the capacitor. In the case of FIG. 10, the inductances $s'_1$, $s'_3$ are connected to the same side of the supply and can therefore be merged to form a single inductance; similar considerations apply to the inductances $s'_2$, $s'_4$, and the two thyristors $t'_1$, $t'_3$ can be replaced by two diodes and a single thyristor.

Figure 11:
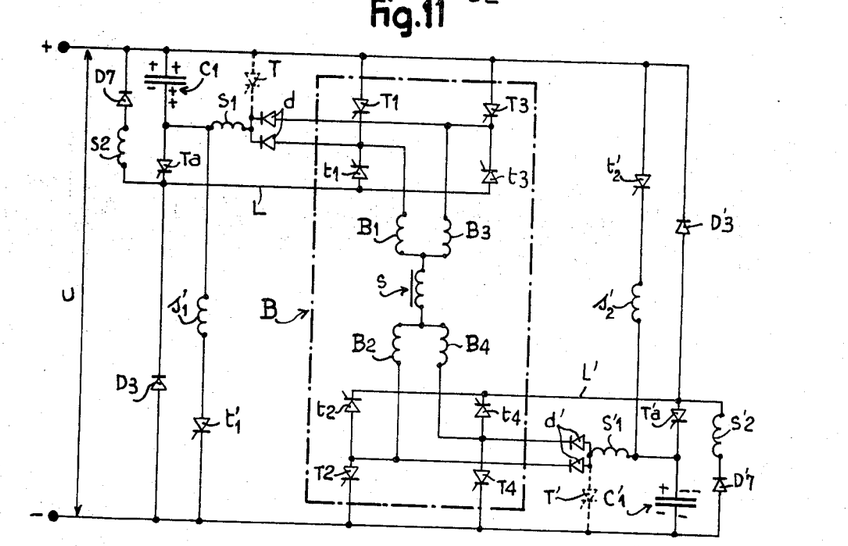
FIGS. 11 and 12 are circuit arrangements which can be considered variants of the foregoing.

The circuit arrangement shown in FIG. 11 provides a control and switching facility according to the invention which enables a motor to operate in the same conditions as are made available by the arrangement shown in FIG. 9 but with the use of a different combination of the control means.

To changeover between states, the arrangement shown in FIG. 11 operates as follows:

It will be assumed that windings $B_1$, $B_2$ are energized via the open thyristors $T_1$, $T_2$ and that the charge of capacitor $C_1$ has been reversed through the agency of the oscillatory circuit comprising $S_1$, $T_1$ and the bottom diode $d$. When $t_1$ and $T_a$ fire, $T_1$ is cut off by the application to it of the reverse voltage from the capacitor $C_1$, whereafter a freewheeling circuit comes into being by way of $D_3$, L, $B_1$, S, $B_2$ and $T_2$; when $T_1$ now fires, the windings just mentioned are reenergized, the freewheeling circuit cuts out and the charge on capacitor $C_1$ is reversed again through the agency of the oscillatory circuit comprising $S_1$ and the bottom diode d, the new voltage across the capacitor $C_1$ being equal and opposite 40 the previous voltage across it.

As in the previous cases, the freewheeling circuit just described can be used for control of the mean current flowing through the windings, on the basis of appropriate graduation of the duration and frequency of the operation of the freewheeling, and to switch the current flowing through winding B to some other odd-numbered winding after the corresponding thyristor has fired.

Of course, since the circuit arrangement is symmetrical, the bottom control unit or section, comprising the elements which are associated with the capacitor $C'_1$ and which have the same letters plus an apostrophe, can provide the same operations and inter alia give a freewheeling operation during which the even-numbered windings can be switched.

For regenerative operation, $t_1$ and $t_2$ open, for $T_1$ and $T_2$ then extinguish and the windings $B_1$, $B_2$ and the reactor S are connected across the supply via on the one hand $t_1$, L and $D_3$ and on the other hand $T_2$, L' and $D'_3$. Starting from this operating condition, switching off even-numbered and odd-numbered windings is by firing of the appropriate supply thyristor.

The inductance $S_2$ associated with the nonreturn diode $D_7$ serves to accelerate discharge of capacitor $C_1$ and to reverse the voltage thereof at relatively low motor currents. The inductance $s'_1$ and the thyristor $t'_1$ serve to strengthen the negative potential of capacitor $C_1$, since the voltage thereacross is very likely, more particularly when the load on the motor is too low, to oscillate between values of progressively decreasing amplitude.

Figure 12:
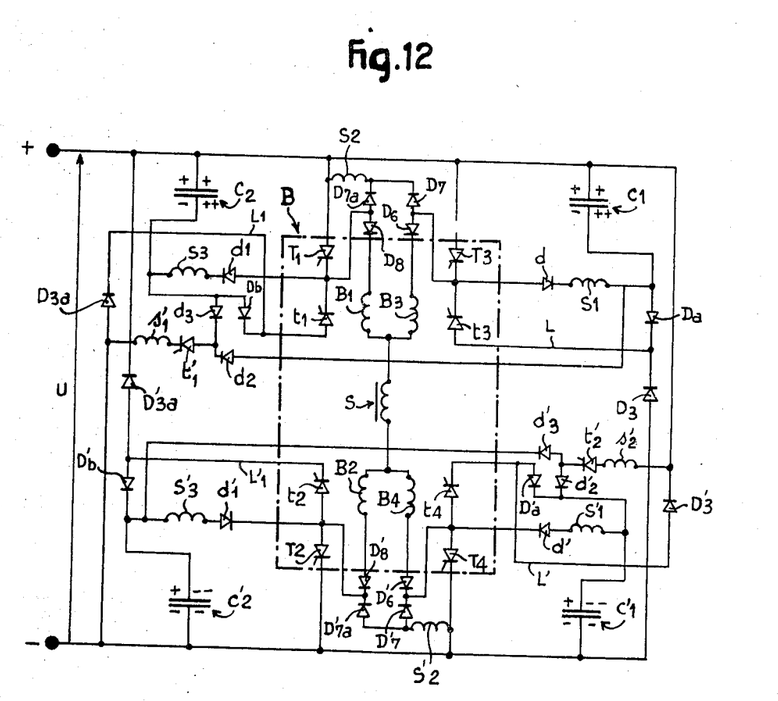

FIG. 12 shows a system offering the same motor operation facilities by means of a control operating along the same lines as the control shown in FIG. 11 but devised to form a freewheeling circuit for each motor winding. In FIG. 12 e.g., the windings $B_1$, $B_2$ are connected, together with reactor S, into a freewheeling circuit when either $t_1$ and $T_2$ or $t_2$ and $T_1$ are open; in the former case the freewheeling circuit extends by way of $D'_8$, $T_2$, $D_{3a}$, $L_1$, $t_1$ and $D_8$ and capacitor $C_2$ charges up to the supply voltage; in the second case the freewheeling circuit extends by way of $D'_8$, $t_2$, $L'_1$, $D'_{3a}$, $T_1$ and $D_8$ and the capacitor $C'_2$ charges up similarly to the same voltage. Assuming the first case and assuming $T_1$ to fire, then $t_1$ extinguishes, the windings $B_1$, $B_2$ are energized at the voltage U, and that side of capacitor $C_2$ which is opposite the side connected to the positive terminal is raised to substantially twice the potential of such terminal due to the combined effect of the diode $d_1$ and of the oscillatory circuit formed by the last-mentioned capacitor and the inductance $S_3$. To return to freewheeling operation, $t_1$ reopens and $T_1$ extinguishes since its cathode potential is made higher than its anode potential, and the free side of the capacitor is connected to the negative side of the supply via $D_b$, $t_1$, $D_8$, $B_1$, S, $B_2$, $D'_8$ and $T_2$.

Regenerative operation is produced in the same way as in the previous cases either, starting from motor operation, by simultaneous opening of the freewheeling thyristors corresponding to the windings, in use or, starting from operation on one of the freewheeling circuits, by the firing of the freewheeling thyristor opposite whichever thyristor is already conductive.

Switching of windings by means of the system shown in FIG. 12 can be performed along the following lines in a manner very similar to the manner described with reference to FIG. 11, namely firing of the appropriate supply transistor after the changeover either to the regenerative position or to the freewheeling position by one of the even-numbered or odd-numbered freewheeling thyristors according as the windings to be switched are even or odd.

The function of the inductances $S_2$ and $S'_2$ associated with the diodes $D_7$, $D_{7a}$ and $D'_7$, $D'_{7a}$ and of the inductances $s'_1$ and $s'_2$ associated with the thyristors $t'_1$ and $t'_2$ and with the diodes $d_2$, $d_3$ and $d'_2$, $d'_3$ is identical to what was described with reference to the elements of like reference to FIG 11.

It was seen that in the circuit arrangements shown in FIGS. 8, 9 and 11 the capacitors $C_1$ or $C_1$ and $C'_1$ are charged when any corresponding main thyristor is opened by circuits containing diodes d or d and d'. The latter diodes can be omitted if thyristors T or T and T' are provided—as shown in chain lines in FIGS. 8, 9 and 11 whose only purpose is to make sure that the capacitors $C_1$ or $C_1$ and $C'_1$ are charged.

Referring now to FIGS. 9 and 11, the freewheeling thyristors $t_1$, $t_3$ or $t_2$, $t_4$ of any of the two winding groups can be replaced by diodes, since the circuit containing such diodes is used to extinguish supply thyristors whereas the circuit containing the thyristors $t_2$, $t_4$ or $t_1$, $t_3$ of the other winding group is used for freewheeling operation; for braking, both the flywheel circuits are cut in, in which event the diodes ensure that the current flows the right way round towards the windings of the regenerating machine.

Figure 13:
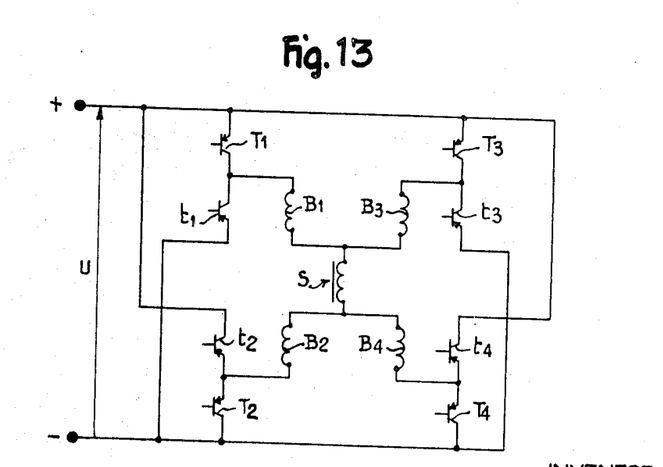
FIG. 13 shows how the switching system according to the invention can be transistorized.

The invention is not of course limited just to the embodiments described with reference to the drawings, the corresponding circuit diagrams being purely exemplary. In general, circuit arrangements deriving from the circuit arrangement described either by simplification thereof or by simple or multiple combination of their elements and/or of their elementary circuits shall be considered as falling under this invention. For instance, all the thyristors shown in FIGS. 9–12, or just the supply thyristors $T_1$ or $T_4$, can be replaced by facilities of appropriate rupturing capacity, in which even the capacitors and their auxiliary charging and discharging facilities can be omitted; the simplified circuit arrangement of FIG. 13 shows what the circuit arrangements of FIGS. 9–12 reduce to when the thyristors of a system can be replaced e.g., by transistors (the known control means for the transistors are not shown in FIG. 13). Similarly, diodes can be used instead of thyristors of any single one or all of the freewheeling groups, and the common inductance can be replaced by a simple connection.

I claim:

1. A system for switching and chopping DC current flowing through the windings of an electric machine comprising:
   a direct current voltage source;
   a pair of power supply conductors connected to the opposite ends of said DC source;
   a plurality of pairs of thyristors including a supply thyristor and a freewheeling thyristor series connected in opposite direction between respectively the first power supply conductor and, through a freewheeling diode oriented as the freewheeling thyristor, the second power supply conductor, the junction between thyristors of each pair being connected with one end of each winding;
   a common junction between the others ends of the windings;
   a smoothing reactor common to the various windings and connected between the said common junction and the second power supply conductor;
   a shutoff capacitor connected in series with an inductance to form an oscillatory circuit connected at one terminal to the second power supply conductor;
   an auxiliary thyristor; and
   means including said oscillatory circuit and said auxiliary thyristor for electrically connecting the first supply conductor to the other terminal of the oscillatory circuit whose shutoff capacitor is consequently energizable by the DC source and for discharging such shutoff capacitor around the anode-cathode of the supply thyristors and for consequently shutting off the supply thyristor which was previously fired, the current in the corresponding winding flowing then, without modification of direction, in a freewheeling conductor path including said winding, said smoothing reactor, said freewheeling diode and the freewheeling thyristor connected in opposite direction with said supply thyristor.

2. A system for switching and chopping DC current flowing through the windings of an electric machine comprising:
   a source of direct current;

a pair of power supply conductors connected across the opposite ends of said DC source;

a plurality of pairs of thyristors including a supply thyristor and a freewheeling thyristor series connected in opposite direction between respectively the first power supply conductor and, through one freewheeling diode oriented as the freewheeling thyristors, the second power supply conductor, the junction between thyristors of each pair being connected to one end of each winding;

a common junction between the other ends of the windings;

a smoothing reactor common to the various windings connected between the said common junction and the second supply conductor;

a shutoff capacitor connected in series with an inductance to form an oscillatory circuit, one of the terminals of said capacitor being directly connected to the second power supply conductor;

a plurality of diodes having common electrodes connected to the inductance of the oscillatory circuit and their other electrodes to junctions between freewheeling and supply thyristors, these diodes being oriented in such a way that the second terminal of the shutoff capacitor is charged to a potential higher than the one of the first power supply conductor when one supply thyristor is switched to a forward conducting state;

an auxiliary thyristor connected between the junction capacitor-inductance of the oscillatory circuit and the common junction of the freewheeling thyristors so that the fired supply thyristor is shutoff by the potential of the second terminal when the said auxiliary thyristor and the freewheeling thyristor associated with the said supply thyristor are switched to a forward conducting state and so that the current in the winding consequently flow, without modification of direction in a freewheeling conducting path including said winding, said smoothing reactor, said freewheeling diode and the said freewheeling thyristor; and a diode and an inductance connected in series between the first power conductor and the common junction of the freewheeling thyristors for equalizing the potentials of the two terminals of the shutoff capacitor when the auxiliary thyristor is switched to a forward conducting state.

3. The system according to claim 2, wherein a second auxiliary thyristor is connected in series with a second inductance between the terminals of the shutoff capacitor for totally discharging said capacitor.

4. The system according to claim 2, wherein the plurality of diodes are deleted and replaced by a second auxiliary thyristor inserted between the first supply conductor and the inductance of the oscillatory circuit for charging the shutoff capacitor.

5. A system for switching and chopping direct current flowing through the windings of a machine operating by simultaneous energizing of two windings taken one each from two winding groups comprising:

a source of direct current;

a pair of power supply conductors connected with the opposite ends of said DC source;

a first group of pairs of thyristors including a supply thyristor and a freewheeling thyristor series connected in opposite direction between the first power supply conductor and, through one first freewheeling diode, the second power supply conductor, the junction between the thyristors of each pair being connected with one end of each winding of the first winding group;

a second group of pairs of thyristors including a supply thyristor and a freewheeling thyristor series connected in opposite direction between the second supply conductor and, through one second freewheeling diode, the first power supply conductor, the junction between thyristors of each pair being connected with one end of each winding of the second winding group;

a common junction between the second ends of the windings of the first group and a common junction between the second ends of the windings of the second group;

a smoothing reactor connected between these two common junctions;

a first and a second oscillatory circuits comprising each an inductance and a shutoff capacitor;

electronics means including the first oscillatory circuit to supply with said DC source said first oscillatory circuit when a supply thyristor of the first group switches to a forward conducting state and consequently to charge the capacitor of said oscillatory circuit with a voltage higher than the one of the source of direct current, and to apply, by turning a freewheeling thyristor associated with said supply thyristor, the higher voltage to the anode-cathode of said supply thyristor so that said thyristor is shut off and that the current in the winding of the first and second group winding flow in a first freewheeling conducting path including said windings, said smoothing reactor, one supply thyristor of the second group, the first freewheeling diode and one freewheeling thyristor of the first group;

electronics means including the second oscillatory circuit to supply with said DC source said second oscillatory circuit when a supply thyristor of the second group switches to a forward conducting state and consequently to charge the capacitor of said oscillatory circuit with a voltage higher than the one of the source of direct current, and to apply, by turning on a freewheeling thyristor associated with said supply thyristor, the higher voltage to the anode-cathode of said supply thyristor so that said thyristor is shut off and that the current in the winding of the first group and the second group flow in a second freewheeling conducting path including said windings, said smoothing reactor, one supply thyristor of the first group, the second freewheeling diode, and one freewheeling thyristor of the second group.

6. A system for switching and chopping direct current flowing through the windings of a machine operating by simultaneous energizing of two windings taken one each from two winding groups comprising:

a source of direct current;

a pair of power supply conductors connected with the opposite ends of said DC source;

a first group of pairs of thyristors including a supply thyristor and a freewheeling thyristor series connected in opposite direction between the first power supply conductor and, through one first freewheeling diode, the second supply conductor, the junction between the thyristors of each pair being connected to one end of each winding of the first winding group;

a second group of pairs of thyristors including a supply thyristor and a freewheeling thyristor series connected in opposite direction between the second power supply conductor and, through one second freewheeling diode, the first power supply conductor, the junction between thyristors of each pair being connected with one end of each winding of the second winding group;

a common junction between the second ends of windings of the first group and a common junction between the second ends of windings of the second group;

a smoothing reactor connected between these two common junctions;

a first shutoff capacitor having one terminal connected to the first supply conductor;

a circuit for charging the second terminal of said capacitor to a potential higher than the one of the first supply conductor, when one supply thyristor of the first group is turned on, including an inductance forming a first oscillatory circuit with said capacitor and a first group of diodes connected between said inductance and the junctions between supply and freewheeling thyristors of the first group;

a first auxiliary thyristor connected between the junction capacitor-inductance and the common junction of the freewheeling thyristors of the first group, said auxiliary thyristor being oriented so that when it is turned on, together with the freewheeling thyristor associated with the fired supply thyristor of the first group, it applies the high potential of the second terminal of the capacitor to the electrode of said supply thyristor opposite to the one connected to the first supply conductor, said supply thyristor being consequently shut off and the current in the windings of the first and second groups being switched off on a freewheeling conducting path including said smoothing reactor, the first freewheeling diode, the fired supply thyristor of the second group and the fired freewheeling thyristor of the first group;

a circuit including a diode and an inductance connected in series and coupled in parallel across the circuit including the first shutoff capacitor and the first auxiliary thyristor, the said inductance forming with the capacitor an oscillatory circuit;

a second shutoff capacitor having one terminal connected to the second supply conductor;

a circuit for charging the second terminal of said capacitor to a potential higher than the one of the second supply conductor, when one supply thyristor of the second group is turned on, said circuit including an inductance forming a second oscillatory circuit with said capacitor and a second group of diodes connected between said inductance and the junctions between supply and freewheeling thyristors of the second group;

a second auxiliary thyristor connected between the junction of said inductance with the second shutoff capacitor and the common junction of the freewheeling thyristors of the second group, the orientation of said second auxiliary thyristor being so that when it is turned on, together with the freewheeling thyristor associated with the fired supply thyristor of the second group, it applies the high potential of the second terminal of the second shutoff capacitor to the electrode of said supply thyristor opposite to the one connected to the second supply conductor, said supply conductor being consequently shut off and the current in the windings of the first and second groups being switched off on a freewheeling conducting path including said smoothing reactor, the second freewheeling diode, the fired supply thyristor of the first group and the fired freewheeling thyristor of the second group; and a circuit including a diode and an inductance connected in series and coupled in parallel across the circuit including the second shutoff capacitor and the second auxiliary thyristor, the said inductance forming with said capacitor an oscillatory circuit.

7. The system according to claim 6, wherein the second terminals of first and second shutoff capacitors are each connected through another inductance and thyristor respectively to the second and first supply conductors.

8. The system according to claim 6, wherein the first and second groups of diodes are deleted and replaced by two thyristors connected respectively to the terminals of the first and second oscillatory circuits.

9. A system for switching and chopping direct current flowing through the windings of a machine operating by simultaneous energizing of two windings taken one each from two winding groups comprising:

a source of direct current;

a pair of power supply conductors connected with the opposite ends of said DC source;

a first group of pairs of transistors including a supply transistor and a freewheeling transistor series connected in opposite direction between the first power supply conductor and the second power supply conductor, the junction between the transistors of each pair being connected with one end of each winding of the first winding group;

a second group of pairs of transistors including a supply transistor and a freewheeling transistor series connected in opposite direction between the second supply conductor and the first supply conductor, the junction between transistors of each pair being connected with one end of each winding of the second winding group;

a common junction between the second ends of the windings of the first group and a common junction between the second ends of the windings of the second group; and a smoothing reactor connected between said two common junctions.

10. The system according to claim 5, wherein the freewheeling thyristors of one of the two winding groups are replaced by diodes.

11. A system according to claim 6, wherein the freewheeling thyristors of one of the two winding groups are replaced by diodes.

12. The system according to claim 1, wherein all the freewheeling thyristors are replaced by diodes.

13. The system according to claim 2, wherein all the freewheeling thyristors are replaced by diodes.

* * * * *